United States Patent [19]

Honda et al.

[11] 4,383,758
[45] May 17, 1983

[54] COPYING APPARATUS

[75] Inventors: Harushisa Honda; Tsutomu Toyono, both of Tokyo, Japan

[73] Assignee: Canon Kabushiki Kaisha, Tokyo, Japan

[21] Appl. No.: 288,162

[22] Filed: Jul. 29, 1981

Related U.S. Application Data

[63] Continuation of Ser. No. 138,972, Apr. 10, 1980, abandoned.

[30] Foreign Application Priority Data

Apr. 13, 1979 [JP] Japan ................................ 54/45201

[51] Int. Cl.³ ............................................. G03B 27/74
[52] U.S. Cl. .................................................. 355/68
[58] Field of Search ....................... 355/67, 68, 69, 70, 355/38

[56]  References Cited

U.S. PATENT DOCUMENTS

| | | | |
|---|---|---|---|
| 3,279,312 | 10/1966 | Rogers | 355/68 |
| 3,679,306 | 7/1972 | Dubois et al. | 355/38 |
| 3,914,049 | 10/1975 | Basu et al. | 355/68 |
| 3,926,518 | 12/1975 | Berry et al. | 355/68 |
| 4,124,294 | 11/1978 | Nakamura | 355/68 |
| 4,124,295 | 11/1978 | Gardiner | 355/68 |

Primary Examiner—Monroe H. Hayes
Attorney, Agent, or Firm—Fitzpatrick, Cella, Harper & Scinto

[57] ABSTRACT

In an image formation apparatus having light source means whose light has a spectrum distribution variable with time, means for detecting the light output of the light source means, a control circuit for controlling the turn-on input of the light source means in accordance with the output generated by said light output detecting means and for maintaining the output of said detecting means constant, and a photosensitive medium on which an original image illuminated by said light source means is projected through an optical system, spectrum distribution correcting means for maintaining a proper relation among the spectrum sensitivity of said light output detecting means, the general spectrum transmission factor of said optical system and the spectrum sensitivity of the photosensitive medium is provided to maintain constant the quantity of light to which said photosensitive medium responds.

17 Claims, 12 Drawing Figures

COPYING APPARATUS

This is a continuation of application Ser. No. 138,972, filed Apr. 10, 1980, now abandoned.

BACKGROUND OF THE INVENTION

1. Field of the Invention

This invention relates to a copying apparatus in which an original to be copied is illuminated by light source means whose light has a relative spectrum distribution variable with time.

2. Description of the Prior Art

There is known an apparatus in which, to prevent fluctuation with time of the quantity of incident light to a photosensitive medium, the light output of a light source, in other words, the emitted light from the light source, is received by a light detecting element and the electrical input to the light source is controlled so that the output signal of said element becomes constant, thereby making the light output of said light source constant. (See U.S. Pat. No. 4,124,294, for example.)

However, there the light source is an enveloped gas type light source like a fluorescent lamp, particularly, where the tube wall temperature during turn-on is low, not only the light output of the light source is varied with time but also the relative spectrum distribution of the light emitted from the light source is varied with time as will hereinafter be described in detail. This is because the rate of variation with time of the intensity of the emitted light of the enveloped gas differs from that of the intensity of the emitted light of the fluorescent material. When such a light source is used as an original illuminating light source, good image stability cannot be obtained in the known apparatus as described above. The reason is that depending on the relation among the spectrum sensitivities of the photosensitive medium and the light detecting element, the spectrum distribution of the light source, and the spectrum transmission factor and spectrum reflection factor of an optical system (lenses, mirrors, etc.) interposed between the light source and the photosensitive medium, the quantity of light to which the photosensitive medium responds is varied with time as will later be described, even if the light output received by the light detecting element as a quantity-of-light detecting element is constant. Accordingly, for example, where it is desired to produce a number of copies continuously, the quality of the copy image is gradually varied with lapse of time and, for example, even if the first copy is good in quality of image, copies produced after repeated cycles of copying may become inferior in quality of visible image and thus, the stability of the image may not be maintained.

Figure 1:
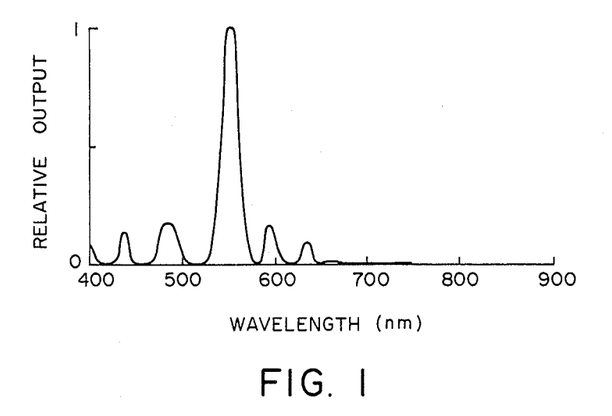
FIG. 1 is a graph for illustrating the output of the fluorescent lamp at its stable period.
Figure 2:
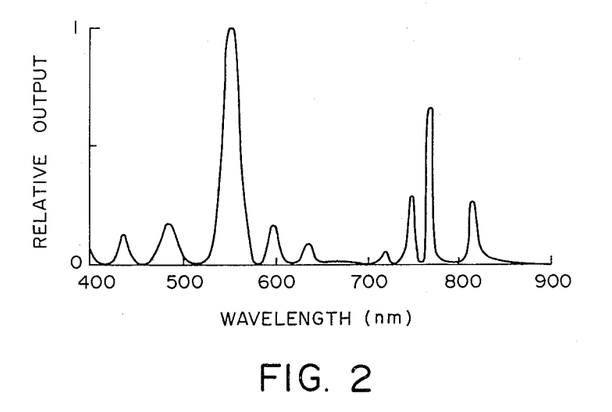
FIG. 2 is a graph for illustrating the output of the fluorescent lamp at its initial period.
Figure 3:
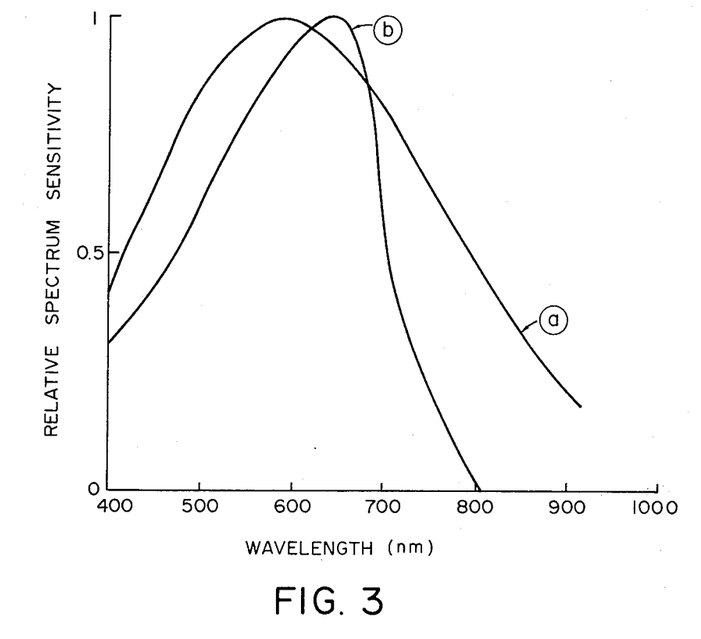
FIG. 3 is a graph for illustrating the spectrum characteristics of an example of the light detecting element and an example of the photosensitive medium.
Figure 4:
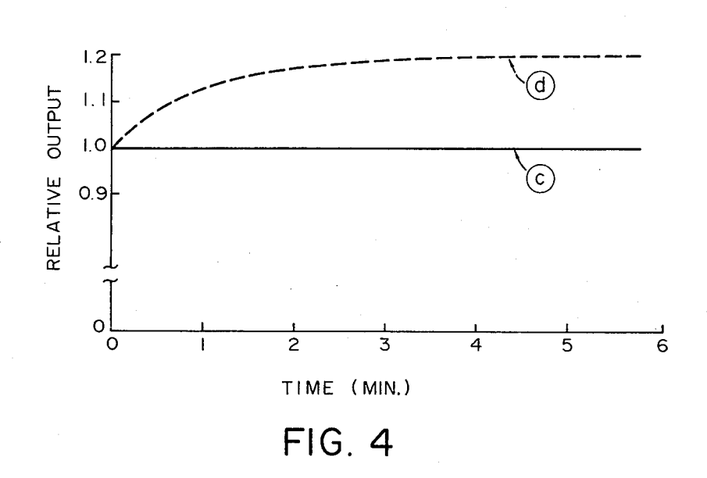
FIG. 4 is a graph for illustrating the variations with time in output of the light detecting element and photosensitive medium in an apparatus according to the prior art.

The above phenomenon will be explained with respect to an actual example. As the original illuminating light source, use has been made of a fluorescent lamp whose relative spectrum distribution becomes such as shown in FIG. 1 of the accompanying drawings after a sufficient time lapse has occurred as required for the relative spectrum distribution variation of the emitted light to cease, for example, about five minutes, has elapsed from the turn-on thereof. The relative spectrum distribution of this fluorescent lamp immediately after the turn-on thereof is shown in FIG. 2 of the accompanying drawings. In FIGS. 1 and 2, the light in the wavelength range of 700–800 nm is chiefly the emitted light of the enveloped argon gas and the light in the wavelength range of 500–600 nm is chiefly the emitted light of the fluorescent material. The intensity of the emitted light of the argon gas decreases with time and the spectrum of the emitted light of the fluorescent material increases with time. Also, a silicon photocell has been used as the light source controlling light detecting element, and cadmium sulfide has been used as the electrophotographic photosensitive medium (photoconductive medium). FIG. 3 of the accompanying drawings shows the relative spectrum sensitivity (a) of the light detecting element and (b) of the photosensitive medium. A voltage has been applied to the photosensitive medium, and a current flowing through the photosensitive medium when light is applied thereto has been measured as the output. This output corresponds to the quantity of light to which the photosensitive medium responds. When the input to the fluorescent material has been controlled so that the output current of the light detecting element becomes constant, there has been obtained the result as shown in FIG. 4 of the accompanying drawings. In FIG. 4, (c) represents the output of the light detecting element which is constant while the output (d) of the photosensitive medium to which light is applied through an image forming optical system begins to increase immediately after the turn-on of the fluorescent lamp.

As is apparent from FIG. 4, by simply controlling the light source so as to render the output signal of the light detecting element constant, the quantity of incident light to the photosensitive medium may be made constant but the quantity of light to which the photosensitive medium responds cannot be made constant. This is because the relative distribution of the emitted light of the fluorescent lamp is varied with time as already described. As a result, the image density is varied with time and good image stability cannot be obtained.

SUMMARY OF THE INVENTION

It is an object of the present invention to provide a copying apparatus in which good images can be obtained even if the relative spectrum distribution of the emitted light of the original illuminating light source means is varied with time.

It is another object of the present invention to provide a copying apparatus of simple construction which displays good image stability even if the relative spectrum distribution of the emitted light of the original illuminating light source means is varied with time.

Other objects and features of the present invention will become apparent from the following detailed description taken in conjunction with the accompanying drawings.

DESCRIPTION OF THE PREFERRED EMBODIMENTS

Figure 5A:
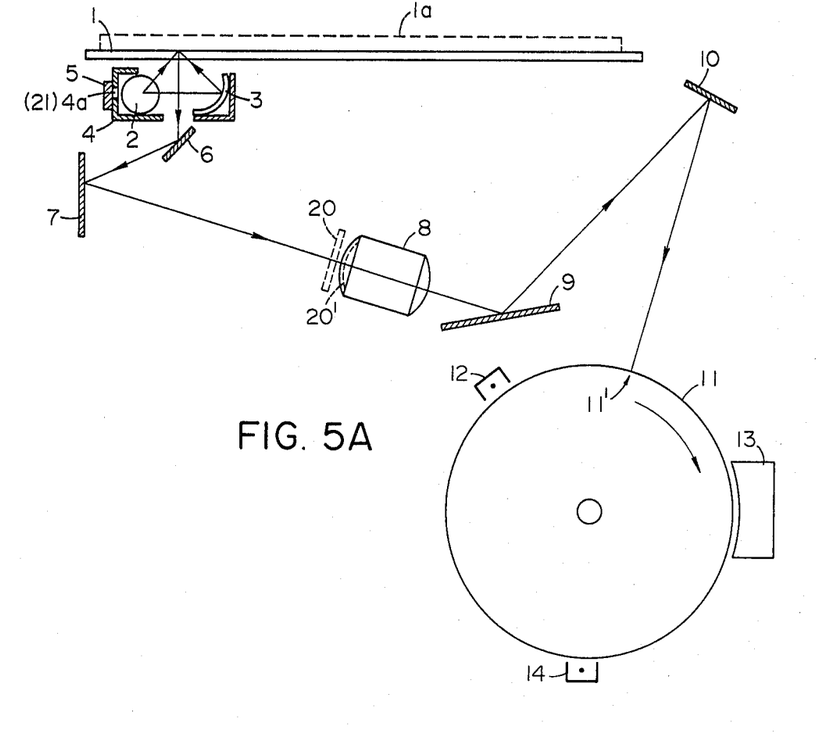
FIG. 5A illustrates an embodiment of the present invention.

In FIG. 5A, an original $1a$ to be copied is placed on a transparent glass carriage 1. This original $1a$ is illuminated by light emitted from a light source 2 disposed below the glass carriage 1. That is, part of the light from the light source 2 impinges directly on the original, and another part of the light is reflected by a reflecting plate 3 and then impinges on the original. The light reflected by the original $1a$ is reflected by mirrors 6 and 7 in succession, enters a lens 8, leaves the lens 8, and then is reflected by mirrors 9 and 10 in succession, and impinges on an electrophotographic photosensitive medium at an exposure position $11'$. The lens 8 is disposed at a position capable of focusing the light image of the original $1a$ on the carriage onto the photosensitive medium at the position $11'$. The photosensitive medium 11 is rotated in the direction of the arrow, and the carriage 1 is moved in the direction of the arrow in synchronism with the rotation of the photosensitive medium. The original $1a$ is scanned by the movement of the carriage 1, whereby the photosensitive medium 11 is slit-exposed to the image of the original. Alternatively, the mirrors 6 and 7 may be moved rightwardly parallel to the original carriage 1 at a velocity ratio of $1:\frac{1}{2}$ in synchronism with the rotation of the photosensitive medium 11 to thereby scan the original. In an apparatus wherein the mirrors 6 and 7 are so moved, the light source 2 and the reflecting plate 3 are also moved with the mirror 6.

A charger 12 lies before the exposure position $11'$ with respect to the path of rotation of the photosensitive medium 11, and the photosensitive medium 11 is uniformly charged by the action of the charger 12. Thereafter, the photosensitive medium 11 is exposed to the light image of the original at the position $11'$, whereby an electrostatic latent image is formed on the photosensitive medium 11. This electrostatic latent image is developed by a developing device 13. The toner image resulting from the development is transferred to an image supporting medium such as paper by an image transfer device 14. The toner image thus transferred to the image supporting medium is fixed by a fixing device. The above-described toner image formation process may be repeated to provide a desired number of copies.

The light source 2 and the reflecting plate 3 are held by a holding member 4, which is provided with an optical opening $4a$. A light detecting element 5 is disposed in proximity or closely adjacent to the optical opening $4a$. Part of the light emitted from the light source 2 passes through the opening $4a$ to the light detecting element 5. Thus, the element 5 puts out an electrical signal corresponding to the quantity of light to which it has responded. (That the element 5 or the photosensitive medium 11 responds to light does not mean that the element 5 or the photosensitive medium 11 simply receives the light but that they are electrically varied by the light which has impinged thereon. Accordingly, the quantity of light to which the light detecting element or the photosensitive medium has responded is determined correspondingly to a formula $\int L(\lambda) \times R(\lambda) \, d\lambda$, where $L(\lambda)$ is the spectrum distribution of the light which has impinged on the light detecting element or the photosensitive medium, $R(\lambda)$ is the spectrum sensitivity of the light detecting element or the photosensitive medium, and $\lambda$ is the wavelength of the light.)

In FIG. 5A, there is no lens or mirror between the light source 2 and the light detecting element 5. However, the light having passed through the opening $4a$ of the holding member 4 may be reflected by a mirror 22 and directed to a lens 23 so that the light may be condensed on the light detecting element 5 by this lens 23.

Figure 6:
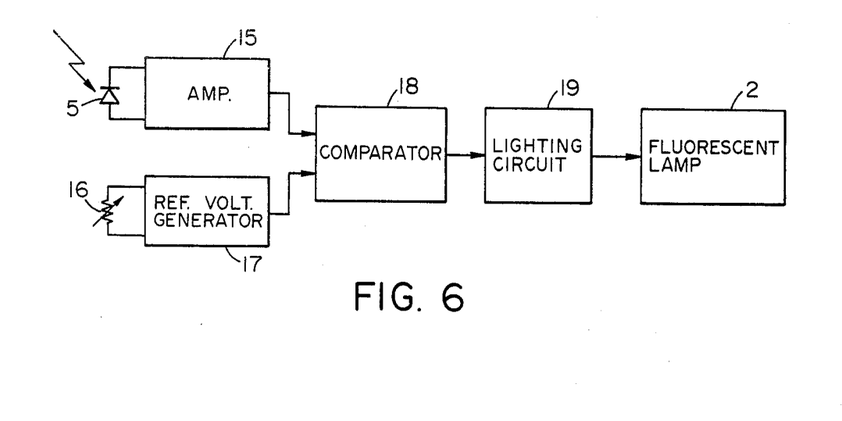
FIG. 6 illustrates the control system in the present invention.

In FIG. 6, the output signal of the light detecting element 5 is amplified by an amplifier 15. On the other hand, there is a reference voltage generator 17 whose output is variable by a variable resistor 16 extraneously operable by the operator, and the output of this generator 17 and the output of the amplifier 15 are applied to a comparator circuit 18. The comparator circuit 18 compares the two outputs and controls a lighting circuit 19 in accordance with the magnitude relation between said two outputs, thereby controlling the input power to the lamp 2. By this, the quantity of light emitted from the lamp 2 is controlled and the quantity of light to which the light detecting element 5 responds is controlled so as to be constant. In other words, the quantity of light emitted from the lamp 2 is controlled so that the output signal of the element 5 is maintained constant. By adjusting the variable resistor 16, the image density desired by the operator may be obtained.

The means described in connection with FIG. 2, by themselves, the image stability cannot maintain for the aforementioned reason when the relative spectrum distribution of the light emitted from the fluorescent lamp 2 is varied with time. The present invention solves such inconvenience.

Let $D(\lambda)$ be the spectrum sensitivity of the photosensitive medium 11, $S(\lambda)$ be the spectrum sensitivity of the light detecting element 5, $T(\lambda)$ be the spectrum passage factor of the optical path leading from the light source 2 through the original carriage 1 to the photosensitive medium 11 (the product of the spectrum transmission factor of the carriage 1, the spectrum reflection factors of the mirrors 6, 7, 9, 10, the spectrum transmission factor of the lens 8 and the spectrum reflection factor or the spectrum transmission factor of each optical element lying in the optical path), and $M(\lambda)$ be the spectrum passage factor between the light source 2 and the light detecting element. As regards the spectrum distribution of the light emitted from the fluorescent lamp which is the light source 2, the spectrum distribution of the light from the fluorescent lamp is $k_1(\lambda) \, f_1(t)$ and the spectrum distribution of the light by the enveloped argon gas is $k_2(\lambda) \, f_2(t)$ (where $f_1(t)$ and $f_2(t)$ represent the variations in intensity of the emitted lights for time and usually $f_1(t) \neq f_2(t)$).

In this case, the quantity of light $P_s(t)$ to which the light detecting element 5 responds may be expressed by the following equation:

$$Ps(t) = \int S(\lambda)M(\lambda)k_1(\lambda)f_1(t)d\lambda + \int S(\lambda)M(\lambda)k_2(\lambda)f_2(t-)d\lambda \quad (1)$$

Also, the quantity of light PD(t) to which the photosensitive medium 11 responds may be expressed by the following equation:

$$PD(t) = \int D(\lambda)T(\lambda)k_1(\lambda)f_1(t)d\lambda + \int D(\lambda)T(\lambda)k_2(\lambda)f_2(t)d\lambda \quad (2)$$

Therefore, the condition is derived for which, when the quantity of light Ps(t) to which the light detecting element 5 responds is constant ($\partial Ps/\partial t = 0$), the quantity of light PD(t) to which the photosensitive medium 11 responds also becomes constant ($\partial PD/\partial t = 0$). From $\partial Ps/\partial t$, $$(df_1(t)/dt)\int S(\lambda)M(\lambda)k_1(\lambda)d\lambda + (df_2(t)/dt)\int S(\lambda)M(\lambda)k_2(\lambda)d\lambda = 0 \quad (3)$$

In order that there may be provided $\partial PD/\partial t = 0$ at this time, the following must be established:

$$(df_1(t)/dt)\int D(\lambda)T(\lambda)k_1(\lambda)d\lambda + (df_2(t)/dt)\int D(\lambda)T(\lambda)k_2(\lambda)d\lambda = 0 \quad (4)$$

The condition for which these equations (3) and (4) are established is as follows:

$$\frac{\int S(\lambda)M(\lambda)k_2(\lambda)d\lambda}{\int S(\lambda)M(\lambda)k_1(\lambda)d\lambda} = \frac{\int D(\lambda)T(\lambda)k_2(\lambda)d\lambda}{\int D(\lambda)T(\lambda)k_1(\lambda)d\lambda} \quad (5)$$

From equation (5), the following is obtained with C as a constant depending on the wavelength ($\lambda$):

$$\left\{ \begin{array}{l} S(\lambda)M(\lambda)k_1(\lambda) = C \cdot D(\lambda)T(\lambda)k_1(\lambda) \\ S(\lambda)M(\lambda)k_2(\lambda) = C \cdot D(\lambda)T(\lambda)k_2(\lambda) \end{array} \right\} \quad (6)$$

From the relation of equation (6), the following is derived:

$$S(\lambda)M(\lambda) = C \cdot D(\lambda)T(\lambda) \quad (7)$$

In the foregoing, $\lambda$ is the wavelength of the light. If equation (7) is substantially established in respect to the wavelength range of the light emitted from the light source 2, it is possible to maintain substantially constant the quantity of light to which the photosensitive medium 11 responds, by controlling the input to the light source 2 so that the output of the light detecting element 5 is constant even if the relative spectrum distribution of the light emitted from the light source 2 is varied with time. That is, the quantity of light to which the light detecting element 5 responds can be made to substantially correspond to the quantity of light to which the photosensitive medium 11 responds, whereby there may be obtained an image of satisfactory quality.

Description will now be made of specific means for establishing equation (7). In FIG. 5A, assume that the spectrum passage factor of the optical system comprising the original carriage 1, mirrors 6, 7, lens 8 and mirrors 9, 10 in said optical path leading from the light source 2 to the photosensitive medium 11 is $T_1(\lambda)$. In that case, at a suitable position in the optical path, for example, at a position immediately before the lens 8, there may be disposed a sepectrum distribution correcting filter 20 whose spectrum transmission factor $T_2(\lambda)$ is approximately expressed by $$T_2(\lambda) = \frac{S(\lambda)M(\lambda)}{C \cdot D(\lambda)T_1(\lambda)} \quad (8)$$

Figure 7A:
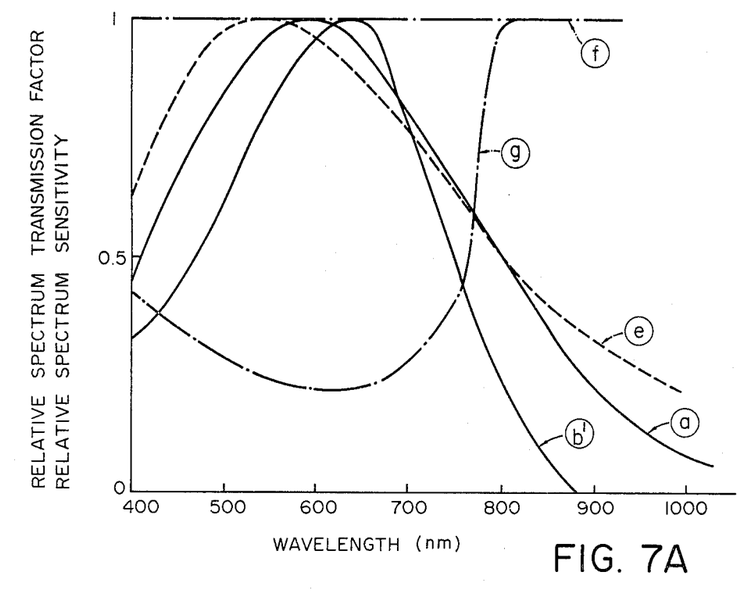
FIG. 7A is a graph for illustrating an embodiment of the present invention.

By this, equation (7) is substantially established. That is, $T_1(\lambda)T_2(\lambda)$ is rendered to $T(\lambda)$ of equation (7). For example, in the case of an apparatus in which a silicon photocell having a spectrum sensitivity as indicated by curve ⓐ in FIG. 7A is employed as the light detecting element 5, CdS having a spectrum sensitivity as indicated by curve ⓑ in FIG. 7A is employed as the photosensitive medium 11, an optical system having a spectrum transmission factor $T_1(\lambda)$ as indicated by curve ⓔ in FIG. 7A is employed as the optical system comprising the original carriage 1, mirrors 6, 7, lens 8 and mirrors 9, 10 and the optical path between the light source 2 and the light detecting element 5 is short and includes no optical element but includes air alone (accordingly, M($\lambda$) is approximately 1 for any $\lambda$ as indicated by curve ⓕ in FIG. 7A), a filter having a spectrum transmission factor as indicated by curve ⓖ in FIG. 7A may be used as the filter 20. In FIG. 7A, it is seen that the quotient of the product of curves ⓐ and ⓕ and the product of curves ⓑ, ⓔ and ⓖ is substantially constant for any wavelength.

Figure 7B:
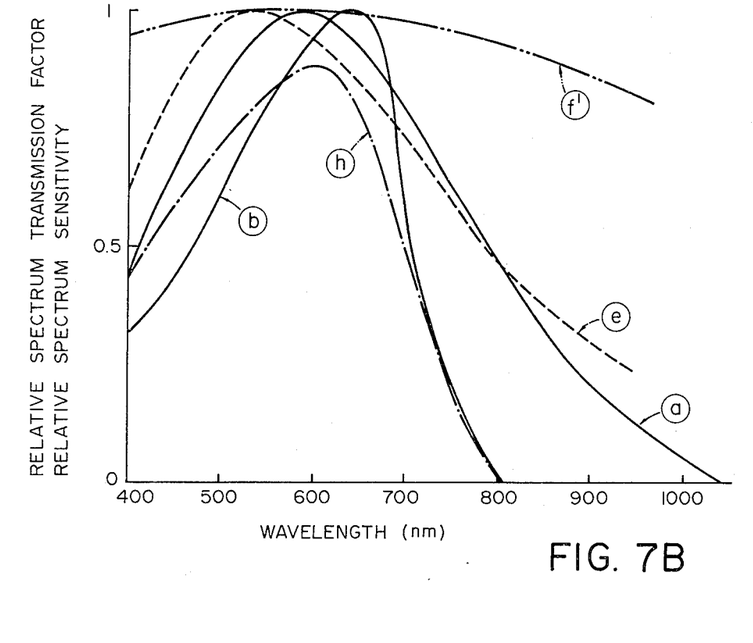
FIG. 7B is a graph for illustrating another embodiment of the present invention.

Description will now be made with the apparatus of FIG. 5B being taken as an example. When the spectrum passage factor of the optical path leading from the light source 2 to the photosensitive medium is $T(\lambda)$, and spectrum distribution correcting filter 21 whose spectrum transmission factor $M_2(\lambda)$ is $$M_2(\lambda) = \frac{C \cdot D(\lambda) \cdot T(\lambda)}{S(\lambda) \cdot M_1(\lambda)} \quad (9)$$

is disposed at a suitable position in the optical path between the light source 2 and the light detecting element 5, for example, immediately before the lens 23. In this case, however, it is to be understood that when this filter is removed from the optical path between the light source 2 and the element 5, the spectrum passage, factor $M_1(\lambda)$ of that optical path is such as indicated by curve ⓕ in FIG. 7B. For example, in the case of an apparatus in which the silicon photocell is employed as the light detecting element 5, CdS having a spectrum sensitivity as indicated by curve ⓑ in FIGS. 3 and 7B is employed as the photosensitive medium 11 and the spectrum passage factor of the optical path between the light source 2 and the photosensitive medium 11 is such as indicated by curve ⓔ in FIG. 7B, the filter 21 disposed in the opening 4a may be one having a spectrum transmission factor as indicated by curve ⓗ in FIG. 7B. In FIG. 7B, it is seen that the quotient of the product of curves ⓐ, ⓕ and ⓗ and the product of curves ⓑ and ⓔ is substantially constant for any wavelength. $M_1(\lambda)$ may be considered to be the product of the spectrum reflection factor of the mirror 22 and the spectrum transmission factor of the lens 23. Also, $M_1(\lambda)M_2(\lambda)$ is regarded as M($\lambda$) of equation (9).

Figure 5B:
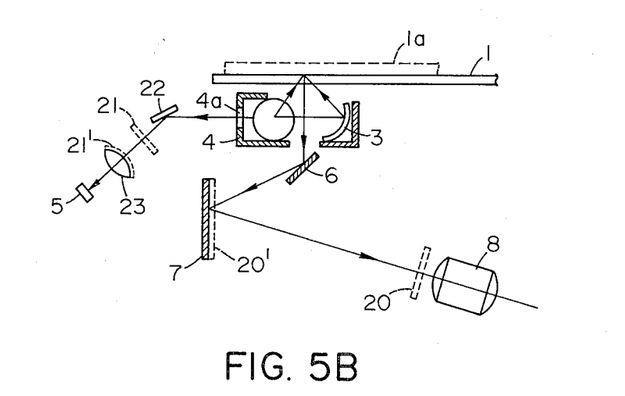
FIG. 5B illustrates another embodiment of the present invention.

Alternatively, the filter 21 alone may be used in FIG. 5A or the filter 20 alone may be used in FIG. 5B, so that equation (7) may be substantially established. Or alternatively, in the foregoing examples, a spectrum distribution correcting filter may be disposed both in the optical path between the light source and the photosensitive medium and in the optical path between the light source and the light detecting element. In this case, the spectrum transmission characteristics of the respective filters are determined so that equation (7) is substantially established by disposing the respective filters in the corresponding optical paths.

Another embodiment will now be described. The light emitted from the fluorescent lamp 2 is divided into two lights, namely, a light in the wavelength range of 500–600 nm emitted chiefly from the fluorescent material (hereinafter referred to as the first light) and an argon spectrum chiefly in the wavelength range of 700–800 nm (hereinafter referred to as the second light), and the first and the second light exhibit different variations with time. Accordingly, if the ratio between the quantity of the first light to which the light detecting element 5 and the photosensitive medium 11 respond and the quantity of the second light to which they respond is substantially constant, the quantity of light to which the photosensitive medium 11 responds can be maintained substantially constant by controlling the input to the light source 2 so that the output of the element 5 becomes constant, whereby an image of satisfactory quality can be obtained. That is, if $M(\lambda)S(\lambda)$ and $T(\lambda)D(\lambda)$ for the first light are $A_1$ and $B_1$, respectively and $M(\lambda)S(\lambda)$ and $T(\lambda)D(\lambda)$ for the second light are $A_2$ and $B_2$, respectively and if the relation that $$A_1/A_2 = B_1/B_2 \qquad (11)$$

is substantially established, the quantity of light to which the light detecting element 5 responds and the quantity of light to which the photosensitive medium 11 responds correspond as described above even if the first and second lights are differently varied with time. As a specific means for carrying this out, a spectrum distribution correcting filter 20 may be disposed in the optical path between the light source 2 and the photosensitive medium 11 and/or a spectrum distribution correcting filter 21 may be disposed in the optical path between the light source 2 and the light detecting element 5.

Figure 8A:
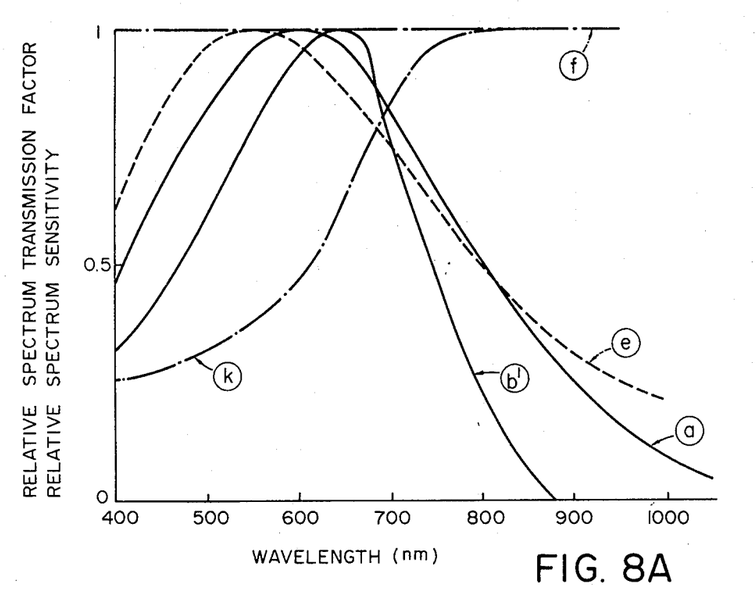
FIG. 8A is a graph for illustrating still another embodiment of the present invention.

For example, in FIG. 5A, if a silicon photocell having a spectrum sensitivity as indicated by curve ⓐ in FIG. 8A is used as the light detecting element 5 and CdS having a spectrum sensitivity as indicated by curve ⓑ in FIG. 8A is used as the photosensitive medium 11 and if $M(\lambda)$ is the curve ⓕ which is substantially 1 for any wavelength $\lambda$ and the spectrum passage factor $T_1(\lambda)$ of the optical system comprising the original carriage 1, mirrors 6, 7, lens 8 and mirrors 9, 10 is represented by curve ⓔ, then the relation of equation (11) is substantially established by disposing a filter 20 having a spectrum transmission characteristic as indicated by curve ⓚ in FIG. 8A in the optical path between the light source 2 and the photosensitive medium 11.

Figure 8B:
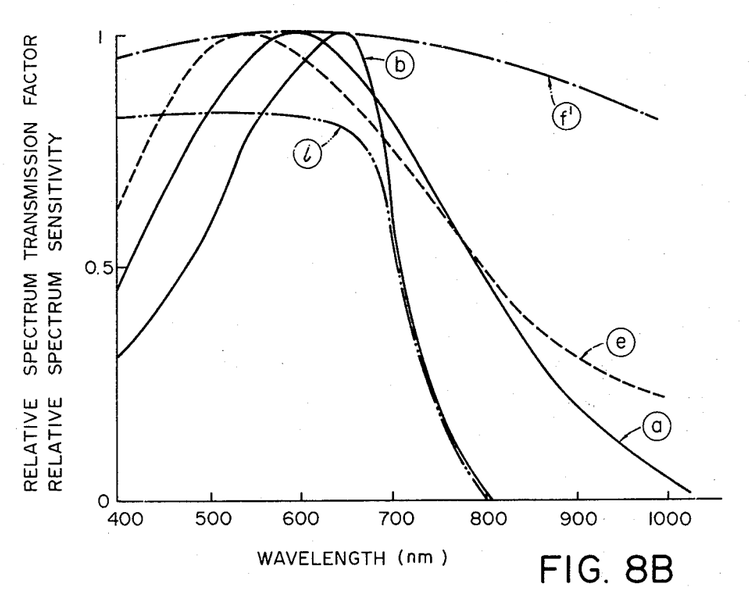
FIG. 8B is a graph for illustrating another embodiment of the present invention.

Also, for example, in the apparatus of FIG. 5B, if $T(\lambda)$ is represented by curve ⓔ and a filter 21 having a spectrum transmission factor $M_2(\lambda)$ as indicated by curve ⓘ in FIG. 8B is disposed in the optical path between the light source 2 and the light detecting element 5, the relation of equation (11) is substantially established. In this case, the spectrum passage factor $M_1(\lambda)$ of the optical path between the light source 2 and the light detecting element 5 when the filter 21 has been removed is curve ⓕ. In the case of FIG. 5B, $M_1(\lambda)$ is usually varied in accordance with the wavelength and in that case, use may be made of a filter 21 having $M_2(\lambda)$ for which equation (11) is substantially established with $M_1(\lambda) \times M_2(\lambda)$ as $M(\lambda)$.

Alternatively, design may be made such that equation (11) is established by using the filter 21 alone in FIG. 5A, or using the filter 20 alone in FIG. 5B, or using the spectrum distribution correcting filters 20 and 21 both in FIGS. 5A and 5B.

Still another embodiment will be described.

Figure 9:
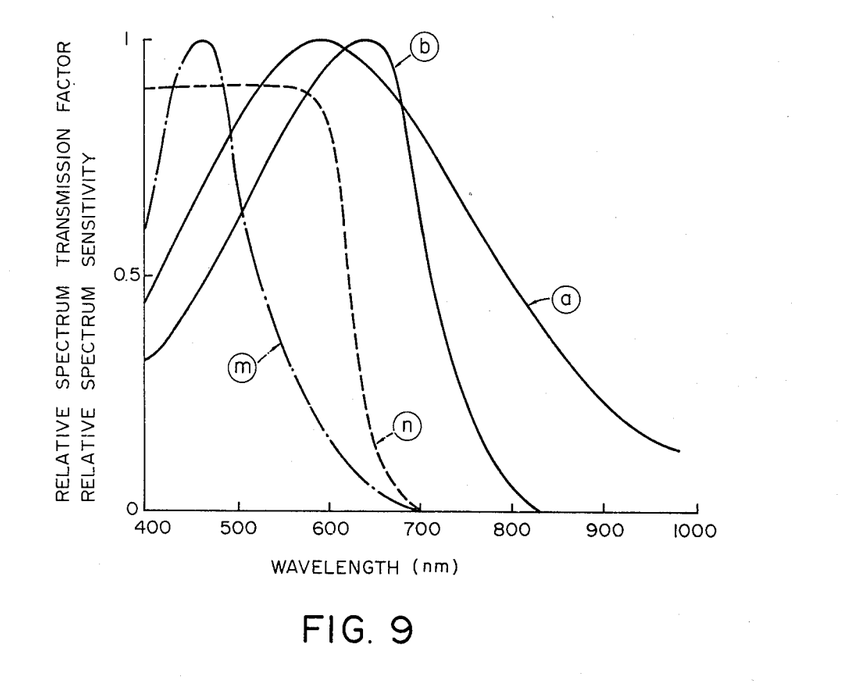
FIG. 9 is a graph for illustrating a further embodiment of the present invention.

For example, selenium is used as the photosensitive medium 11. The spectrum sensitivity of this photosensitive medium is very weak in sensitivity to the second light (argon spectrum), as indicated by curve ⓜ in FIG. 9. That is, this photosensitive medium has substantially no spectrum sensitivity to the second light. On the other hand, a silicon photocell having a spectrum sensitivity as indicated by curve a in FIG. 9 is used as the light detecting element 5. This element 5 has a spectrum sensitivity both to the first light and the second light. Thus, in FIGS. 5A and 5B, a filter 21 having a spectrum transmission factor as indicated by curve ⓝ in FIG. 9 is disposed in the optical path between the light source 2 and the element 5. This filter 21 shields almost all of the second light of the light emitted from the light source 2, against the element 5. Thereby, the output of the element 5 substantially corresponds to the quantity of light to which the photosensitive medium 11 responds.

Also, where CdS having a spectrum sensitivity both to the first light and the second light as indicated by curve ⓑ in FIG. 9 is used as the photosensitive medium 11 and a substance, such as, for example, selenium light-receiving element, having a spectrum sensitivity as indicated by curve ⓜ in FIG. 9, in other words, responsive to the first light but not substantially responsive to the second light, is used as the light detecting element 5, a filter 20 having a spectrum transmission characteristic as indicated by the curve ⓝ may be disposed in the optical path between the light source 2 and the photosensitive medium 11. This filter 20 shields almost all of the second light against the photosensitive medium 11 and therefore, the output of the element 5 substantially corresponds to the quantity of light to which the photosensitive medium 11 responds.

Where a silicon photocell having a characteristic as indicated by the curve ⓐ and responsive both to the first light and the second light is used as the light detecting element 5 and CdS having a characteristic as indicated by the curve ⓑ and responsive both to the first light and the second light is used as the photosensitive medium 11, filters 20 and 21 having a spectrum transmission factor as indicated by curve ⓝ in FIG. 9, that is, having a sufficiently lower spectrum transmission factor to the second light than that to the first light, may be disposed in the optical path between the light source 2 and the photosensitive medium 11 and the optical path between the light source 2 and the element 5, respectively. The second light differently varied with time from the first light is substantially shielded against the element 5 and the photosensitive medium 11, respectively, and therefore, the output of the element 5 corresponds to the quantity of light to which the photosensitive medium 11 responds.

In these three embodiments, there is approximately established the following equation $$\int S(\lambda)M(\lambda)k_1(\lambda)d = \int D(\lambda)T(\lambda)k(\lambda)d\lambda = 0 \qquad (12)$$

which is derived from equations (3) and (4). If this equation (12) is substantially established, there will be obtained a practically satisfactory image.

In the above-described embodiments, the filters 20 and 21 having a wavelength selecting characteristic have been added in addition to the mirrors and lenses. However, instead of so adding the filters 20 and 21 in addition to the mirrors and lenses, optical thin films 20' and 21' having spectrum passage factors similar to those of the filters 20 and 21 may be attached to any one of the mirrors 6, 7, 9, 10, 22 and the lenses 8 and 23 as, by evaporation, to provide these mirrors and lenses with a wavelength selecting characteristic.

The filter 20 may be disposed anywhere in the optical path from the lamp 2 to the photosensitive medium 11. For example, it may be disposed immediately before the exposure position 11'. The filter 21 may also be disposed anywhere in the optical path from the lamp 2 to the light detecting element 5. For example, it may be attached to the light-receiving surface of the light detecting element 5.

The term "spectrum passage factor" used herein is defined by $E(\lambda)/I(\lambda)$, where $I(\lambda)$ is the intensity of the incident light to a set optical path and $E(\lambda)$ is the intensity of the emergent light from this optical path. Accordingly, the spectrum passage is a term covering the spectrum reflection factor and the spectrum transmission factor.

The present invention is applicable not only to copying apparatus which use fluorescent lamps having the spectrum distribution as shown in FIGS. 1 and 2, but also copying apparatus which use which fluorescent lamps as the original illuminating light source. Further, as a light source having a spectrum distribution variable with time like such fluorescent lamps, there are light sources in which different light-emitting substances are included and respective spectra are generated by excitation and which can have different temperature characteristics, and the present invention is applicable to copying apparatus which use such light sources as the original illuminating light source. For example, high pressure mercury lamps (lamps having halides such as In, Ta, Na, Li and the like added in mercury vapor, especially, what is called metal halide lamps), and natrium lamps (lamps in which a suitable amount of Na and several mm Hg of starting rare gas are enveloped) may be mentioned. Particularly, as regards the natrium lamps, natrium vapor pressure is low immediately after the lamp has been turned on. Thus, such lamps exhibit the discharge characteristic of the rare gas, but with lapse of time, they display a phenomenon such that natrium is gradually evaporated to cause a drop of the lamp voltage and in about twenty minutes, they assume a stable discharge state. The present invention is applicable to copying apparatus which use such light sources.

Also, the present invention is not restricted to ordinary electrophotographic copying apparatus but is also applicable to apparatus in which an original light image is one converted into an electrical signal by a photoelectric converter device or the like and such signal is used to form a visible image.

What we claim is:

1. A copying apparatus provided with original illuminating light source means whose light has a relative spectrum distribution variable with time, said apparatus comprising:

an image forming optical system for directing the light from an original illuminated by said light source means to a photosensitive medium to form the image of said original on said photosensitive medium;

a light detecting element irradiated with the light emitted from said light source means, said element forming a signal corresponding to the quantity of light to which it responds;

means for controlling the quantity of light emitted from said light source means in response to said signal so as to maintain said signal substantially constant;

spectrum distribution correcting means disposed in one of the optical paths from said light source means to said light detecting element, and from said light source means to said photosensitive means, said means correcting the spectrum distribution of the light passing therethrough so that, irrespective of the variation with time in the relative spectrum distribution of the light emitted from said light source means, the quantity of light to which said light detecting element responds substantially corresponds to the quantity of light to which said photosensitive medium responds.

2. The copying apparatus according to claim 1, wherein said spectrum distribution correcting means has a spectrum passage characteristic for substantially establishing $M(\lambda) \times S(\lambda) = C \times T(\lambda) \times D(\lambda)$, where $M(\lambda)$ is the spectrum passage factor of the optical path leading from said light source means to said light detecting element, $S(\lambda)$ is the spectrum sensitivity of said light detecting element, $T(\lambda)$ is the spectrum passage factor of the optical path leading from said light source means to said photosensitive medium, $D(\lambda)$ is the spectrum sensitivity of said photosensitive medium, $\lambda$ is the wavelength, and C is a constant independent of the wavelength.

3. The copying apparatus according to claim 1, wherein said light source means is a light source means which emits a first light whose relative intensity is variable with time and a second light whose wavelength range differs from that of said first light and whose relative intensity is variable with time differently from that of said first light, and said spectrum distribution correcting means has a spectrum passage characteristic for substantially establishing $A_1/A_2 = B_1/B_2$, where $A_1$ and $A_2$ are $M(\lambda) \times S(\lambda)$ for said first light and said second light, $B_1$ and $B_2$ are $T(\lambda) \times D(\lambda)$ for said first light and said second light, $M(\lambda)$ is the spectrum passage factor of the optical path leading from said light source means to said light detecting element, $S(\lambda)$ is the spectrum sensitivity of said light detecting element, $T(\lambda)$ is the spectrum passage factor of the optical path leading from said light source means to said photosensitive medium, $D(\lambda)$ is the spectrum sensitivity of said photosensitive medium, and $\lambda$ is the wavelength.

4. The copying apparatus according to claim 1, wherein said light source means is a light source means which emits a first light whose relative intensity is variable with time and a second light whose wavelength range differs from that of said first light and whose relative intensity is variable with time differently from that of said first light, said light detecting element has a spectrum sensitivity to said first light but does not substantially have a spectrum sensitivity to said second light, said photosensitive medium has a spectrum sensitivity both to said first light and said second light, and said spectrum distribution correcting means has a spectrum passage characteristic in which the passage factor of said second light is smaller than the passage factor of said first light, said spectrum distribution correcting means being disposed in the optical path between said light source means and said photosensitive medium.

5. The copying apparatus according to claim 1, wherein said light source means is a light source means which emits a first light whose relative intensity is variable with time and a second light whose wavelength range differs from that of said first light and whose relative intensity is variable with time differently from that of said first light, said photosensitive medium has a spectrum sensitivity to said first light but does not substantially have a spectrum sensitivity to said second light, said light detecting element has a spectrum sensitivity both to said first light and said second light, and said spectrum distribution correcting means has a spectrum passage characteristic in which the passage factor of said second light is smaller than the passage factor of said first light, said spectrum distribution correcting means being disposed in the optical path between said light source means and said light detecting element.

6. The copying apparatus according to claim 1, wherein said light source means is a light source means which emits a first light whose relative intensity is variable with time and a second light whose wavelength range differs from that of said first light and whose relative intensity is variable with time differently from that of said first light, said light detecting element and said photosensitive medium having a spectrum sensitivity both to said first light and said second light, and said spectrum distribution correcting means having a spectrum passage characteristic in which the passage factor of said second light is smaller than the passage factor of said first light, said spectrum distribution correcting means being disposed in each of said two optical paths.

7. The copying apparatus according to any one of claims 1, 2, 3, 4, 5, or 6, wherein said light source means has a plurality of light-emitting substances.

8. A copying apparatus provided with original illuminating light source means whose light has a relative spectrum distribution variable with time, said apparatus comprising:
an image forming optical system for directing the light from an original illuminated by said light source means to a photosensitive medium to form the image of said original on said photosensitive medium;
a light detecting element irradiated with the light emitted from said light source means, said element forming a signal corresponding to the quantity of light to which it responds;
means for controlling, in accordance with said signal, the quantity of the light incident on said photosensitive member from the original;
spectrum distribution correcting means disposed in one of the optical paths from said light source means to said light detecting element, and from said light source means to said photosensitive means, for correcting the spectrum distribution of light passing therethrough so that the quantity of that part of the controlled light incident on the photosensitive member to which the photosensitive member is sensitive is substantially independent of the variation with time in the relative spectrum distribution of the light emitted from said light source means.

9. The copying apparatus according to claim 8, wherein said spectrum distribution correcting means has a spectrum passage characteristic for substantially establishing $M(\lambda) \times S(\lambda) = C \times T(\lambda) \times D(\lambda)$, where $M(\lambda)$ is the spectrum passage factor of the optical path leading from said light source means to said light detecting element, $S(\lambda)$ is the spectrum sensitivity of said light detecting element, $T(\lambda)$ is the spectrum passage factor of the optical path leading from said light source means to said photosensitive medium, $D(\lambda)$ is the spectrum sensitivity of said photosensitive medium, $\lambda$ is the wavelength, and C is a constant independent of the wavelength.

10. The copying apparatus according to claim 8, wherein said light source means is a light source means which emits a first light whose relative intensity is variable with time and a second light whose wavelength range differs from that of said first light and whose relative intensity is variable with time differently from that of said first light, and said spectrum distribution correcting means has a spectrum passage characteristic for substantially establishing $A_1/A_2 = B_1/B_2$, where $A_1$ and $A_2$ are $M(\lambda) \times S(\lambda)$ for said first light and said second light, $B_1$ and $B_2$ are $T(\lambda) \times D(\lambda)$ for said first light and said second light, $M(\lambda)$ is the spectrum passage factor of the optical path leading from said light source means to said light detecting element, $S(\lambda)$ is the spectrum sensitivity of said light detecting element, $T(\lambda)$ is the spectrum passage factor of the optical path leading from said light source means to said photosensitive medium, $D(\lambda)$ is the spectrum sensitivity of said photosensitive medium, and $\lambda$ is the wavelength.

11. The copying apparatus according to claim 8, wherein said light source means is a light source means which emits a first light whose relative intensity is variable with time and a second light whose wavelength range differs from that of said first light and whose relative intensity is variable with time differently from that of said first light, said light detecting element has a spectrum sensitivity to said first light but does not substantially have a spectrum sensitivity to said second light, said photosensitive medium has a spectrum sensitivity both to said first light and said second light, and said spectrum distribution correcting means has a spectrum passage characteristic in which the passage factor of said second light is smaller than the passage factor of said first light, said spectrum distribution correcting means being disposed in the optical path between said light source means and said photosensitive medium.

12. The copying apparatus according to claim 8, wherein said light source means is a light source means which emits a first light whose relative intensity is variable with time and a second light whose wavelength range differs from that of said first light and whose relative intensity is variable with time differently from that of said first light, said photosensitive medium has a spectrum sensitivity to said first light but does not substantially have a spectrum sensitivity to said second light, said light detecting element has a spectrum sensitivity both to said first light and said second light, and said spectrum distrubution correcting means has a spectrum passage characteristic in which the passage factor of said second light is smaller than the passage factor of said first light, said spectrum distribution correcting means being disposed in the optical path between said light source means and said light detecting element.

13. The copying apparatus according to claim 8, wherein said light source means is a light source means which emits a first light whose relative intensity is variable with time and a second light whose wavelength range differs from that of said first light and whose relative intensity is variable with time differently from that of said first light, said photosensitive medium having spectrum sensitivity to said first light and said second light, and said spectrum distribution correcting means having a spectrum passage characteristic in which the passage factor of said second light is smaller than the passage factor of said first light, said spectrum distribution correcting means being disposed in each of said two optical paths.

14. The copying apparatus according to any one of claims 8, 9, 10, 11, 12 or 13, wherein said light source mean has a plurality of light-emitting substances.

15. The copying apparatus according to claim 1, 2, 3, 8, 9 or 10, wherein said correcting means is disposed across the optical path between said light source means and said detecting element.

16. The copying apparatus according to claim 1, 2, 3, 8, 9 or 10, wherein said correcting means is disposed across the optical path between said light source means and said photosensitive member.

17. The copying apparatus according to claim 1, 2, 3, 8, 9, or 10, wherein said correcting means is disposed across the optical path between said light source means and said detecting element, and across the optical path between said light source means and said photosensitive member.

* * * * *